United States Patent [19]

Jung

[11] Patent Number: 4,943,042
[45] Date of Patent: Jul. 24, 1990

[54] BAND SAW BLADE FIXTURE

[76] Inventor: Wayne Jung, 4005 Camrose Ave., New Berlin, Wis. 53151

[21] Appl. No.: 428,906

[22] Filed: Oct. 30, 1989

[51] Int. Cl.⁵ .................................................. B25B 1/00
[52] U.S. Cl. .................................... 269/296; 269/87.2
[58] Field of Search ................. 269/277, 295, 87, 87.1, 269/87.2, 87.3, 49, 296; 76/78 R, 78 A, 25 A, 36

[56] References Cited

U.S. PATENT DOCUMENTS

| | | | |
|---|---|---|---|
| 2,211,242 | 8/1940 | McIntosh | 269/87.2 |
| 2,482,002 | 9/1949 | Hoenes | 269/277 |
| 2,627,191 | 2/1953 | Parr | 269/277 |
| 2,949,291 | 8/1960 | Olofson | 269/296 |
| 3,879,026 | 4/1975 | Lappin, Jr. | |
| 4,342,450 | 8/1982 | Maddock | |
| 4,375,173 | 3/1983 | Lesmeister | 269/277 |
| 4,447,050 | 5/1984 | Niemoeller | 269/49 |

*Primary Examiner*—Robert C. Watson
*Attorney, Agent, or Firm*—Joseph S. Heino

[57] ABSTRACT

A band saw blade fixture has a number of symmetrically situated pins extending from one side of a flat plate and separated by a void therebetween to hold the abutted ends of a flexible band saw blade therebetween.

4 Claims, 1 Drawing Sheet

BAND SAW BLADE FIXTURE

SUMMARY OF THE INVENTION

This invention relates to jigs and fixtures for holding objects and more particularly to fixtures for aligning and holding together the abutted ends of a flexible band saw blade to allow the ends to be brazed together.

The use of jigs and fixtures for receiving the ends of a flexible band saw blade preparatory to the joining of the ends of such blades by brazing is well known. See, for example, U.S. Pat. No. 4,342,450 issued to Maddock. Such jigs and fixtures typically utilize a main jig adapted to be secured within a vise or other retaining device. The main jig body includes a clamping arrangement which requires a number of steps to align and secure the flexible band saw blade ends within the clamping arrangement. Such clamping arrangements typically include a number of complex elements in order to accomplish the clamping and securing function desired. Furthermore, such clamping members often do not allow for easy and complete access to all portions of the blade ends which are to be brazed or to the blade joint formed after brazing is completed.

It is, therefore, a principal object of this invention to provide a new, useful and uncomplicated flexible band saw blade brazing fixture for aligning and holding together the ends of a flexible band saw blade to be brazed which requires only a minimal number of elements and a minimal number of steps to align and secure the blade ends. It is another object of this invention to provide such a fixture which accomplishes all of this while providing the user with complete access to the flexible band saw blade ends to be brazed and to the junction formed by the joined ends after brazing is completed.

The present invention has obtained these objects. It provides for a fixture base member adapted to be secured in a vise or other retaining device. The fixture base member is provided with spring means comprising a plurality of symmetrically situated pins which utilize the natural spring forces present in the flexible saw blade ends to hold the ends of the blade securely against and between the pins in position during the brazing process. The fixture is further provided with a cut out in the base member which provides access to both sides of the band saw blade during the brazing process and after that process is completed. The foregoing and other features of the assembly of the present invention will be further apparent from the description which follows.

DETAILED DESCRIPTION

Figure 1:
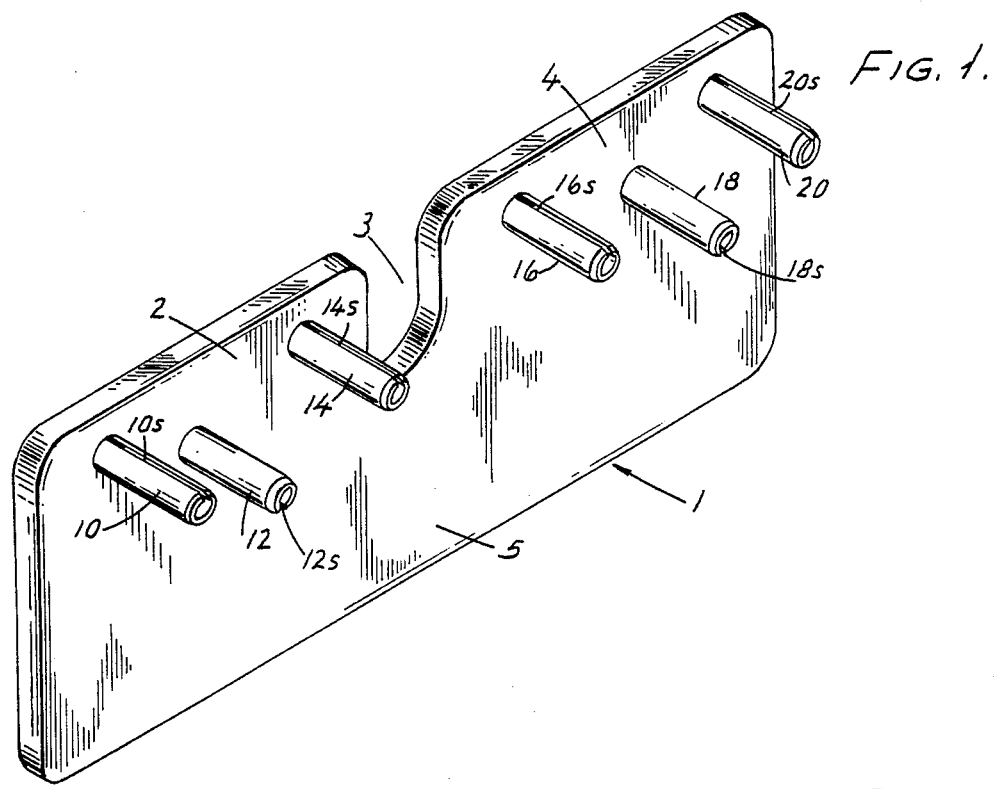
FIG. 1 is a perspective view of the flexible band saw blade fixture of the present invention.

Referring now to the drawings in detail, FIG. 1 shows a flexible band saw blade fixture constructed in accordance with the present invention. The fixture comprises a generally flat rectangular base member generally identified 1 having a lower portion 5, a first upper portion 2 and a second upper portion 4. The lower base member portion 5 is provided to secure the base member in a vise or other clamping or retaining device (not shown). The base member upper portions 2,4 are separated by a centrally located cut-out 3.

Figure 2:
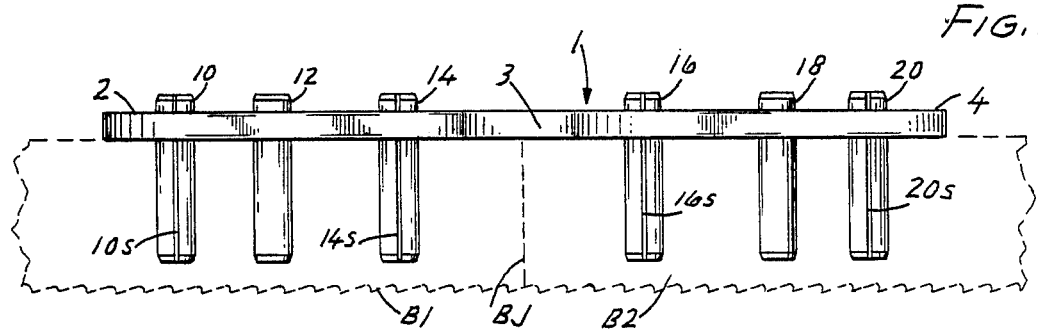
FIG. 2 is a plan view of the fixture shown in FIG. 1.
Figure 3:
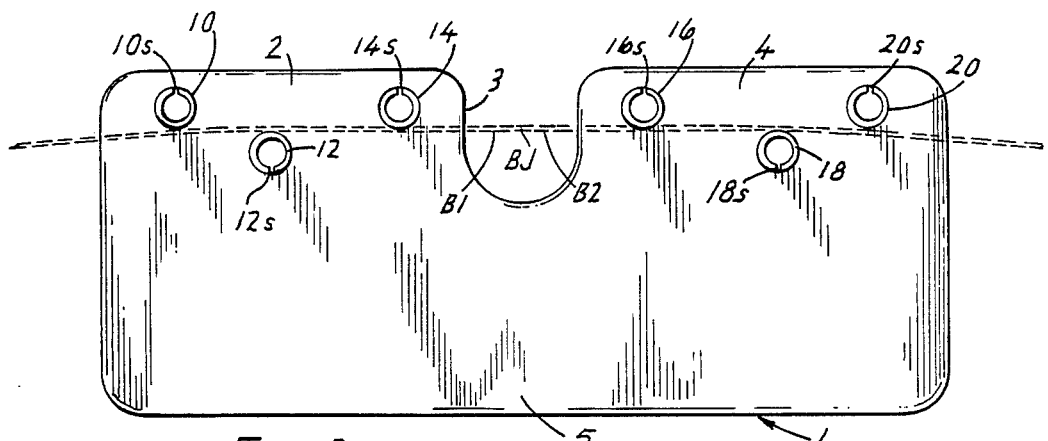
FIG. 3 is a front elevational view of the fixture shown in FIG. 1.

Though not shown, the first base member upper portion 2 contains three holes into which are inserted three spring pins 10, 12, 14. The spring pins 10, 12, 14 of the first base member upper portion 2 have slots 10s, 12s, 14s respectively, which provide the pins with intrinsic spring forces. Similarly, the second base member upper portion 4, contains three holes (also not shown) which are symmetrically situated from those of the first base member upper portion 2 into which are inserted spring pins 16, 18, 20. These spring pins 16, 18, 20 likewise have slots 16s, 18s, 20s respectively. The spring pins of the upper base member portions 2,4 are inserted such that the spring pin slots face away from the blade ends to be inserted between them. See FIGS. 2 and 3. For example, the pin slots 10s, 14s, 16s, 20s in the uppermost pins 10, 14, 16, 20 face upwardly. The pin slots 12s, 18s in the lowermost pins 12, 18 face downwardly. In this configuration, the natural spring forces known to exist in both the blade ends B1, B2 and in the pins which hold them are utilized to hold the blade ends B1, B2 in place. The symmetry existing between the pins of each of the upper base member portions 2, 4 results in the blade ends B1, B2 being presented in end-to-end and substantially planar alignment. Using ¼ in. (6.5 mm.) diameter spring pins, optimal placement of the pins has been found to exist by separating the innermost pins 14, 16 by 1⅝ in. (41.275 mm.), the middle pins 12, 18 by 3⅜ in. (85.725 mm.) and the outermost pins 10, 20 by 4⅝ in. (117.475 mm.), with the innermost pins 14, 16 being situated on a line located 0.015 in. (0.381 mm.) upwardly from a line connecting the middle pins 12, 18 and with the outermost pins 10, 20 being situated on a line located 0.267 in. (6.78 mm.) downwardly from the middle pins 12, 18.

In application, the first end of a blade B1 is aligned generally horizontally and perpendicularly in relation to the first base member upper portion 2 such that the flat or nonserrated side of the blade end B1 faces the upper portion 2. The blade end B1 is flexed and urged in spring retention relationship between the pins 10, 12, 14 of the first upper base member portion 2. The end of the first blade portion B1 is situated at or near the center of the cut-out 3. See FIGS. 2 and 3. The same procedure is followed with the second blade end B2 which is placed in similar relationship between the spring pins 16, 18, 20 of the second upper base member portion 4. The blade ends B1, B2 are urged together to form a blade end joint BJ. With the blade ends B1, B2 so aligned and secured, the user is then ready to apply the brazing process to the junction formed at the blade ends B1, B2. By placement of the blade end joint BJ at the base member cut-out 3, complete access to the joint BJ during and after the brazing process is provided.

From the foregoing detailed description of the illustrative embodiment of the invention set forth herein, it will be apparent that there has been provided a new, useful and uncomplicated flexible band saw blade fixture which can be used for aligning and holding together the abutted ends of a flexible band saw blade to allow the ends to be brazed together, which requires only a minimal number of elements and a minimal number of steps to use, and which accomplishes all of this while providing the user with complete access to the flexible band saw blade ends to be brazed and to the junction formed by the joined ends after brazing is completed.

The principles of this invention having been fully explained in connection with the foregoing, I hereby claim as my invention:

1. A flexible band saw blade fixture which comprises
   a base member, said base member comprising a plate having an upper and lower portion, said lower portion adapted to be secured within a vise or other clamping device,
   blade clamping means, said blade clamping means comprising a plurality of symmetrically located pins extending from one side of said base member upper portion, and
   blade access means, said blade access means comprising a void in the base member upper portion situated at the center of said symmetrically located pins.

2. A flexible band saw blade fixture which comprises
   a base member, said base member comprising a generally rectangular plate having an upwardly extending top portion and a downwardly extending bottom portion, said plate having a front and back surface,
   blade clamping means, said blade clamping means comprising a plurality of pins, and
   blade access means, said blade access means comprising a centrally situated void in said upwardly extending base member top portion, said blade clamping pins being divided and symmetrically located to either side of the front surface of said base member top portion void and functionally adapted to hold the ends of a flexible band saw blade therebetween.

3. A fixture for retaining the abutted ends of a flexible band saw blade comprising
   blade alignment means, said blade alignment means comprising a substantially flat base member comprising a longitudinally extending upper portion having a front vertical surface,
   blade access means, said blade access means comprising an opening located generally at the midpoint of said longitudinally extending upper base member portion, and
   blade clamping means, said blade clamping means comprising a first and second plurality of blade clamping pins extending perpendicularly and generally horizontally from said base member upper portion front vertical surface, said first plurality of pins being located to one side of said opening and said second plurality of pins being located symmetrically opposite said first pins and said pins being functionally adapted to hold the ends of a flexible band saw blade therebetween.

4. A fixture for retaining the abutted ends of a flexible band saw blade comprising
   blade alignment means, said blade alignment means comprising a substantially flat base member having a longitudinally extending upper portion and having a front vertical surface,
   blade access means, said blade access means comprising an opening located generally at the midpoint of said longitudinally extending upper base member portion, and
   blade clamping means, said blade clamping means comprising a plurality of pins extending perpendicularly from said base member front vertical surface and situated to either side of said opening, said pins having surfaces adapted to clampingly engage opposite sides of the ends of a flexible band saw blade such that said blade ends are abutted substantially at said base member opening.

* * * * *